United States Patent
Subramonian et al.

(10) Patent No.: US 10,320,448 B2
(45) Date of Patent: *Jun. 11, 2019

(54) INDUCTIVE STRUCTURES WITH IMPROVED COMMON MODE TRANSIENT IMMUNITY

(71) Applicant: TEXAS INSTRUMENTS INCORPORATED, Dallas, TX (US)

(72) Inventors: Rajaram Subramonian, Cupertino, CA (US); Gianpaolo Lisi, Los Gatos, CA (US); Swaminathan Sankaran, Allen, TX (US); Bradley Allen Kramer, Plano, TX (US); Gerard Socci, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,572

(22) Filed: Dec. 21, 2017

(65) Prior Publication Data

US 2018/0115346 A1    Apr. 26, 2018

Related U.S. Application Data

(63) Continuation of application No. 15/270,962, filed on Sep. 20, 2016, now Pat. No. 9,866,283, which is a continuation of application No. 14/311,354, filed on Jun. 23, 2014, now Pat. No. 9,450,651.

(60) Provisional application No. 61/876,796, filed on Sep. 12, 2013, provisional application No. 61/841,765, filed on Jul. 1, 2013.

(51) Int. Cl.
H04B 5/00    (2006.01)

(52) U.S. Cl.
CPC ......... *H04B 5/0087* (2013.01); *H04B 5/0031* (2013.01); *H04B 5/0037* (2013.01)

(58) Field of Classification Search
CPC ... H04B 5/0087; H04B 5/0031; H04B 5/0037
See application file for complete search history.

(56) References Cited

U.S. PATENT DOCUMENTS

| | | | |
|---|---|---|---|
| 5,420,551 | A | 5/1995 | Conte et al. |
| 6,873,065 | B2 | 3/2005 | Haigh et al. |
| 7,482,803 | B2 | 1/2009 | Lee et al. |
| 7,545,059 | B2 | 6/2009 | Chen et al. |
| 7,577,104 | B2 | 8/2009 | Karam et al. |
| 7,577,223 | B2 | 8/2009 | Alfano et al. |

(Continued)

FOREIGN PATENT DOCUMENTS

JP    WO 2012157180 A1 * 11/2012 ............... H04B 3/50

OTHER PUBLICATIONS

Bieler et al., Thierry, "Contactless Power and Information Transmission," IEEE Transactions on Industry Applications, Sep./Oct. 2002, vol. 38, No. 5, pp. 1266-1272, Chicago, IL.

*Primary Examiner* — Dean O Takaoka
(74) *Attorney, Agent, or Firm* — Michael A. Davis, Jr.; Charles A. Brill; Frank D. Cimino

(57) ABSTRACT

In described examples, an inductive structure includes first and second inductive coils to conduct respective first and second common mode currents induced by a common mode transient between: a first ground coupled to a connection between the first and second inductive coils; and a galvanically isolated second ground.

20 Claims, 9 Drawing Sheets

(56) References Cited

U.S. PATENT DOCUMENTS

| | | |
|---|---|---|
| 7,692,444 B2 | 4/2010 | Chen et al. |
| 7,962,444 B2 | 6/2011 | Maciocci |
| 8,385,043 B2 | 2/2013 | Ng et al. |
| 8,527,688 B2 | 9/2013 | Chatterjee et al. |
| 8,552,812 B2 | 10/2013 | Yen et al. |
| 8,928,425 B1 | 1/2015 | Sedarat et al. |
| 9,337,905 B2 | 5/2016 | Lisi et al. |
| 9,450,651 B2 * | 9/2016 | Subramoniam ...... H04B 5/0031 |
| 9,716,440 B2 * | 7/2017 | Kaeriyama .............. H04B 3/50 |
| 9,866,283 B2 * | 1/2018 | Subramonian ....... H04B 5/0087 |
| 2002/0177409 A1 | 11/2002 | Raggam |
| 2007/0018816 A1 | 1/2007 | Matsui et al. |
| 2008/0315925 A1 | 12/2008 | Alfano et al. |
| 2009/0096525 A1 | 4/2009 | Staszewski et al. |
| 2009/0207538 A1 | 8/2009 | Crawley et al. |
| 2009/0227205 A1 | 9/2009 | Rofougaran |
| 2010/0264515 A1 | 10/2010 | Nakashiba |
| 2011/0055598 A1 * | 3/2011 | Yu .......................... G06F 1/266 |
| | | 713/300 |
| 2012/0020419 A1 * | 1/2012 | Kaeriyama ......... H04L 25/4902 |
| | | 375/259 |
| 2013/0241302 A1 | 9/2013 | Miyamoto et al. |
| 2014/0077919 A1 | 3/2014 | Godoy et al. |
| 2014/0168019 A1 | 6/2014 | Hirobe et al. |
| 2015/0340872 A1 | 11/2015 | Franzon et al. |
| 2016/0254846 A1 | 9/2016 | Lisi et al. |

* cited by examiner

INDUCTIVE STRUCTURES WITH IMPROVED COMMON MODE TRANSIENT IMMUNITY

CROSS-REFERENCE TO RELATED APPLICATIONS

This application is a continuation of U.S. patent application Ser. No. 15/270,962 filed Sep. 20, 2016, which is a continuation of U.S. patent application Ser. No. 14/311,354 filed Jun. 23, 2014, which claims priority to: (a) U.S. Provisional Patent Application Ser. No. 61/876,796, filed Sep. 12, 2013, entitled A METHOD TO IMPROVE COMMON MODE TRANSIENT IMMUNITY FOR INDUCTIVE STRUCTURES, naming Rajaram Subramonian et al. as inventors; and (b) U.S. Provisional Patent Application Ser. No. 61/841,765, filed Jul. 1, 2013, entitled A METHOD TO IMPROVE COMMON MODE TRANSIENT IMMUNITY FOR INDUCTIVE STRUCTURES, naming Rajaram Subramonian et al. as inventors. All of the above-identified applications are hereby fully incorporated herein by reference for all purposes.

This application is related to co-owned co-pending U.S. patent application Ser. No. 15/149,996, filed May 9, 2016, entitled INDUCTIVE STRUCTURES WITH REDUCED EMISSIONS AND INTERFERENCE, naming Gianpaolo Lisi et al. as inventors.

BACKGROUND

The disclosures herein relate in general to electronic circuitry, and in particular to inductive structures with improved common mode transient immunity.

An inductively coupled structure (or "inductive structure") is useful for transmitting data (or both data and power) from one or more transmitters to one or more receivers across an isolation barrier that exists between two systems (and/or sub-systems) that have galvanically isolated (e.g., having the effect of blocking direct-current electricity) ground planes. Interference may arise in communicating data between systems when an electronic transient event occurs with respect to (e.g., across) the ground planes of two galvanically isolated systems. If such data are transmitted through a single channel of an inductive structure, then various challenges and limitations may arise. However, if such data are transmitted through multiple channels of an inductive structure, then other challenges and limitations may arise (e.g., increased size, cost, emissions and/or interference).

SUMMARY

In described examples, an inductive structure includes first and second inductive coils to conduct respective first and second common mode currents induced by a common mode transient between: a first ground coupled to a connection between the first and second inductive coils; and a galvanically isolated second ground.

DETAILED DESCRIPTION

Figure 1:
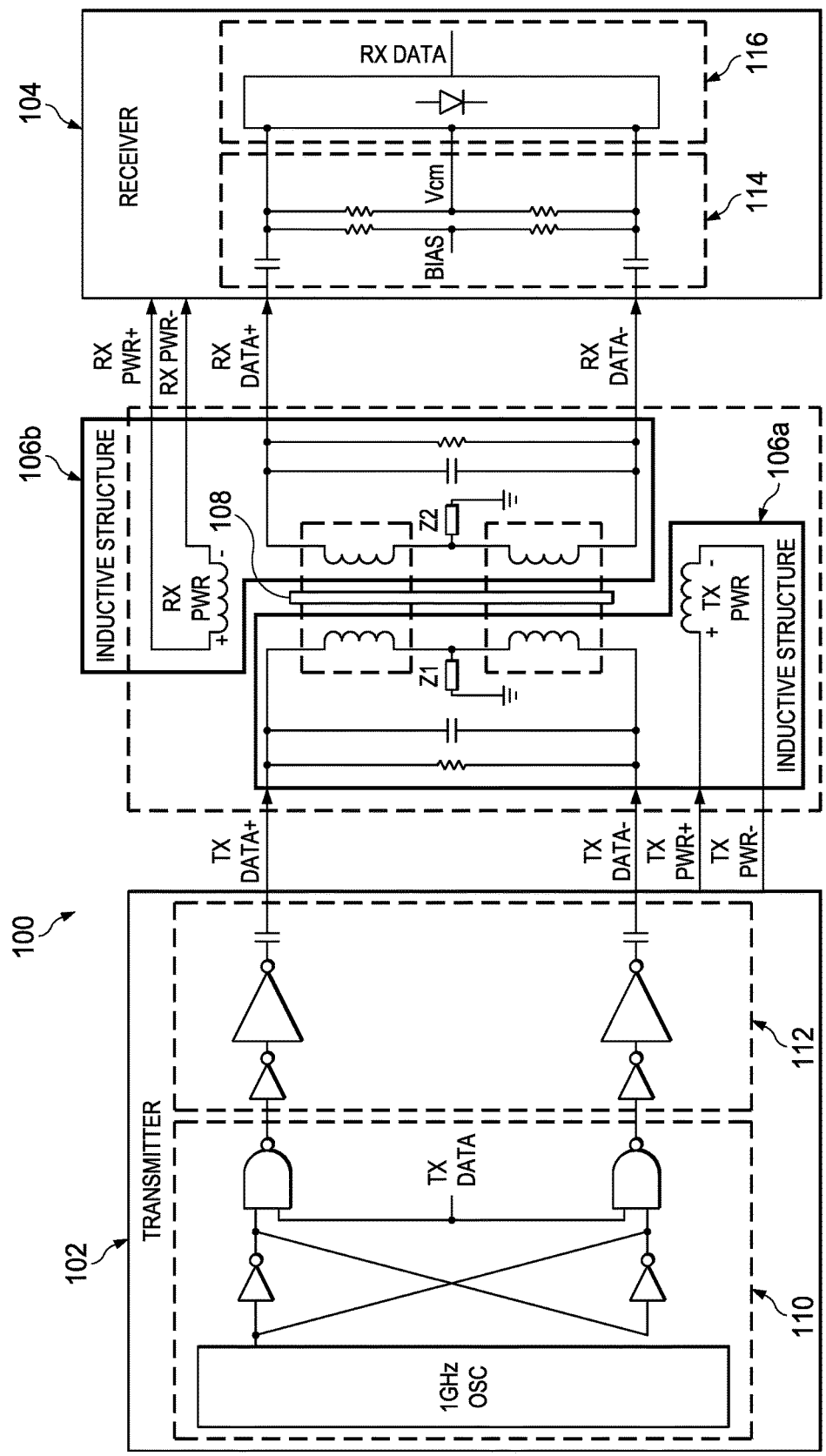
FIG. 1 is a schematic diagram of a system of the illustrative embodiments.

FIG. 1 is a schematic diagram of a system, indicated generally at 100, of the illustrative embodiments. A transmitter 102 outputs data and power to a receiver 104 through a device that includes inductive structures 106a and 106b (collectively, "inductive structure 106"). The inductive structure 106a: (a) receives the data from the transmitter 102 through differential TX Data lines; (b) receives the power from the transmitter 102 through differential TX Power lines; and (c) outputs the data and power by inductive coupling across an isolation barrier 108 to the inductive structure 106b. The inductive structure 106b: (a) receives the data and power by inductive coupling across the isolation barrier 108 from the inductive structure 106a; (b) outputs the data to the receiver 104 (which receives the data) through differential RX Data lines; and (c) outputs the power to the receiver 104 (which receives the power) through differential RX Power lines. As discussed below, optimized impedance devices Z1 and Z2 are optionally included in inductive structure 106b and 106b, respectively.

Transmitter 102 optionally includes: (a) a modulator 110 and (b) a driver 112. The modulator 110 uses the data to be transmitted to modulate a carrier signal (e.g., 1 GHz) and outputs the modulated carrier signal. The driver 112 includes drivers for increasing the electrical drive strength of the output of the modulator 110. The driver 112 includes capacitors for blocking direct current ("DC") of the output of the driver 112. The outputs of the driver 112 are coupled to data inputs of the inductive structure 106.

The inductive structure 106 is a resonant filter for substantially filtering out frequencies outside of a passband (e.g., while blocking transference of direct current from the inductive structure 106a to the inductive structure 106b). The passband is substantially centered around the carrier signal frequency (e.g., 1 GHz) and accordingly permits inductive coupling of data across the isolation barrier 108 from the inductive structure 106a to the inductive structure 106b.

The receiver 104 optionally includes: (a) a high pass filter and common mode voltage generator block 114 and (b) a demodulator 116. The generator block 114: (a) receives a bias voltage; (b) high-pass filters the differential RX Data lines; and (c) generates a common mode voltage in response to the differential RX Data lines. The demodulator 116 demodulates the high-pass filtered differential RX Data lines to recover the data carried by the high-pass filtered differential RX Data lines.

Figure 2:
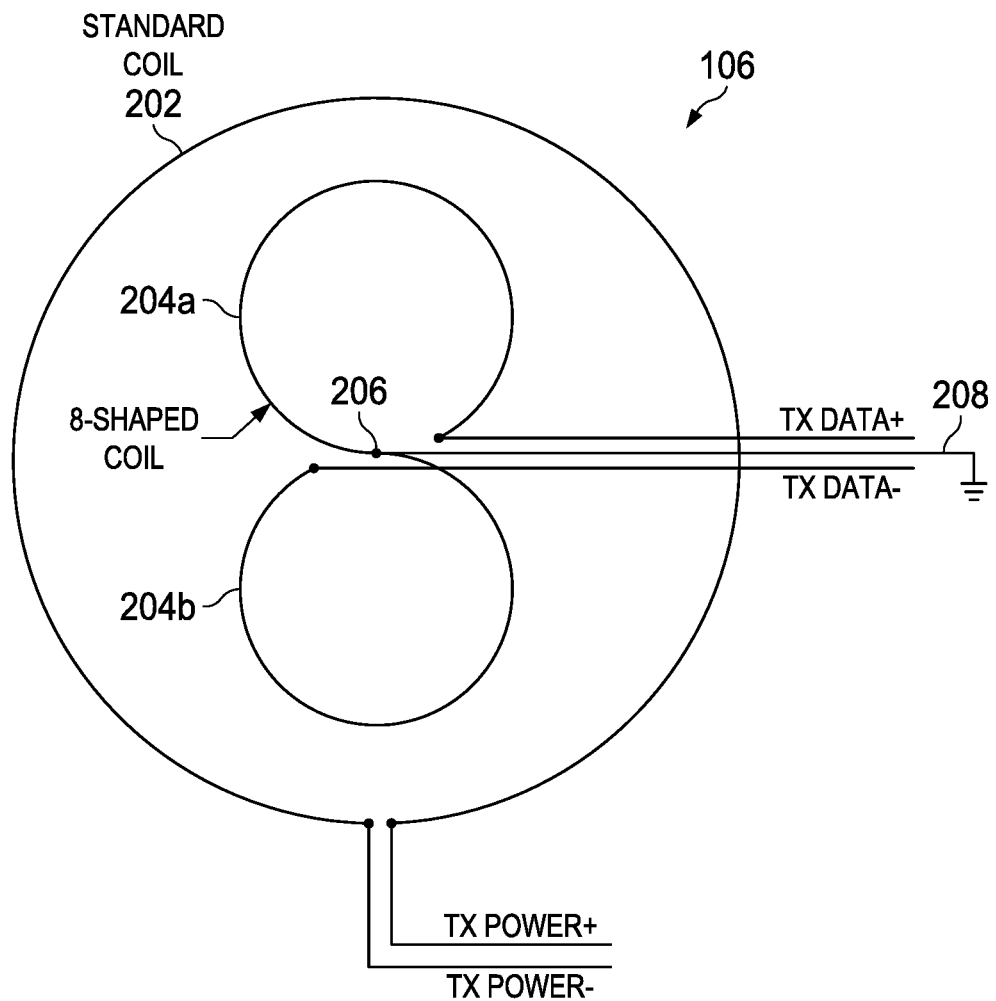
FIG. 2 is a schematic plan view of an inductive structure of FIG. 1.

FIG. 2 is a schematic plan view of the inductive structure 106 for transfer of data and optionally for transfer of power. As shown in FIG. 2, the inductive structure 106a includes: (a) an optional power coil 202 connected to the differential TX Power lines, namely TX Power+ and TX Power−; and (b) data coils 204a and 204b (collectively, "data coil 204") connected to the differential TX Data lines, namely TX Data+ (connected to the data coil 204a) and TX Data− (connected to the data coil 204b). Also, the data coil 204a is connected to the data coil 204b at a node 206, which is coupled through a center tap ground line 208 to a first ground or to an optimized (e.g., for transmission line matching) impedance device Z1.

The data coil 204 is substantially centered within the power coil 202. Accordingly, the data coil 204 is smaller than the power coil 202. Because the data coil 204 is located (e.g., formed) within the center of the power coil 202, the inductive structure 106 has reduced size and cost.

Also, the data coil 204 is formed to have a relatively symmetric shape (e.g., symmetric 8-shape). As shown in FIG. 2, the data coil 204b is substantially identical to (yet reversed from) the data coil 204a. If current flows through the data coil 204a in one direction (e.g., clockwise), then current flows through the data coil 204b in an opposite direction (e.g., counterclockwise). Alternatively, in the case of data transmission only (e.g., without operating power coil 202), the data coils 204a and 204b are reconfigurable to flow current in the same direction as one another. The center tap ground line 208 helps to substantially equalize a voltage between TX Data+ and the center tap ground line 208 ("TX Data+ voltage"), relative to a voltage between TX Data− and the center tap ground line 208 ("TX Data+ voltage").

In this example, an alternating current flows through the power coil 202. A magnetic field induced by the power coil 202 on the data coil 204a results in an electromotive force that is substantially equal in magnitude to (yet opposite in polarity from) an electromotive force induced by the power coil 202 on the data coil 204b, so an effect of magnetic flux from the power coil 202 on the data coil 204a is substantially counterbalanced (e.g., cancelled) by an effect of magnetic flux from the power coil 202 on the data coil 204b. Accordingly, the power coil 202 induces a relatively small difference (if any) between TX Data+ voltage and TX Data− voltage, even if the data coils 204a and 204b might have slight differences (e.g., in size and/or shape) from one another.

Figure 3:
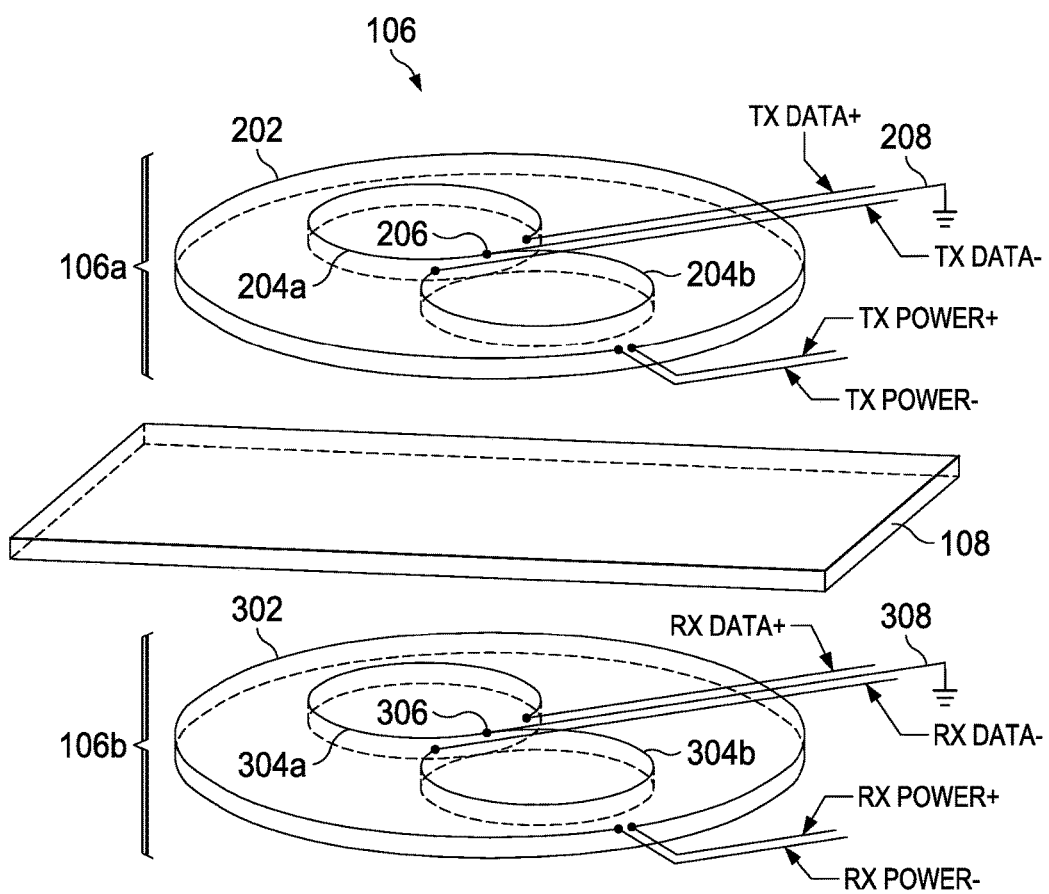
FIG. 3 is a schematic perspective view of the inductive structure of FIG. 1.
Figure 4:
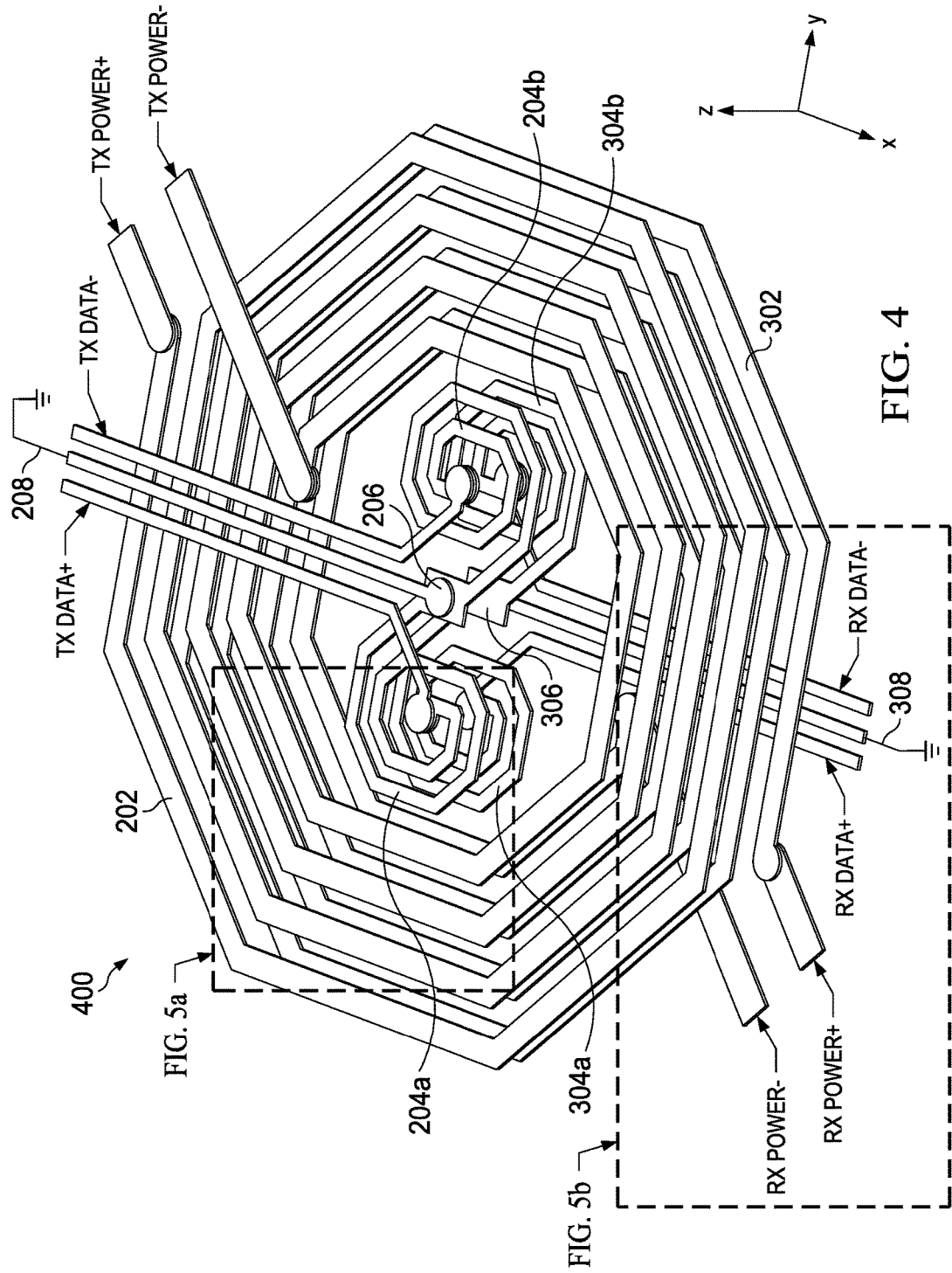
FIG. 4 is a structural perspective view of the inductive structure of FIG. 1.

FIG. 3 is a schematic perspective view of the inductive structure 106. FIG. 4 is a structural perspective view of the inductive structure 106. FIGS. 3 and 4 are not necessarily drawn to scale. As shown in FIGS. 3 and 4, the inductive structure 106b is substantially identical to the inductive structure 106a. Further, as illustrated at 400, the power coils 202 and 302 have multiple turns, and the data coils 204 and 304 have multiple turns.

Accordingly, the inductive structure 106b includes: (a) an optional power coil 302 connected to the differential RX Power lines, namely RX Power+ and RX Power−; and (b) data coils 304a and 304b (collectively, "data coil 304") connected to the differential RX Data lines, namely RX Data+ (connected to the data coil 304a) and RX Data− (connected to the data coil 304b). Also, the data coil 304a is connected to the data coil 304b at a node 306, which is connected to a center tap ground line 308 to a second ground or to an optimized impedance device Z2 that is isolated from: (a) the first ground (e.g., isolated from the center tap ground line 208); and/or (b) optimized impedance device Z1.

Also, the data coil 304 is formed to have a relatively symmetric shape (e.g., symmetric 8-shape). As shown in FIGS. 3 and 4, the data coil 304b is substantially identical to (yet reversed from) the data coil 304a. If current flows through the data coil 304a in one direction (e.g., clockwise), then current flows through the data coil 304b in an opposite direction (e.g., counterclockwise). Alternatively, in the case of data transmission only (e.g., without operating power coil 302), the data coils 304a and 304b are reconfigurable to flow current in the same direction as one another. The center tap ground line 308 helps to substantially equalize a voltage between RX Data+ and the center tap ground line 308 ("RX Data+ voltage"), relative to a voltage between RX Data− and the center tap ground line 308 ("RX Data+ voltage").

Further, as shown in FIGS. 3 and 4, the inductive structures 106a and 106b are aligned with one another (e.g., the data coils 204a and 304a are aligned with one another, and the data coils 204b and 304b are aligned with one another), so that: (a) the power coils 202 and 302 have relatively good coupling with one another; (b) the data coils 204 and 304 have relatively good coupling with one another; and (c) radiated emissions are relatively small (e.g., as radiated by the data coils 204 and 304), which helps with electromagnetic interference ("EMI") certification.

Figure 5A:
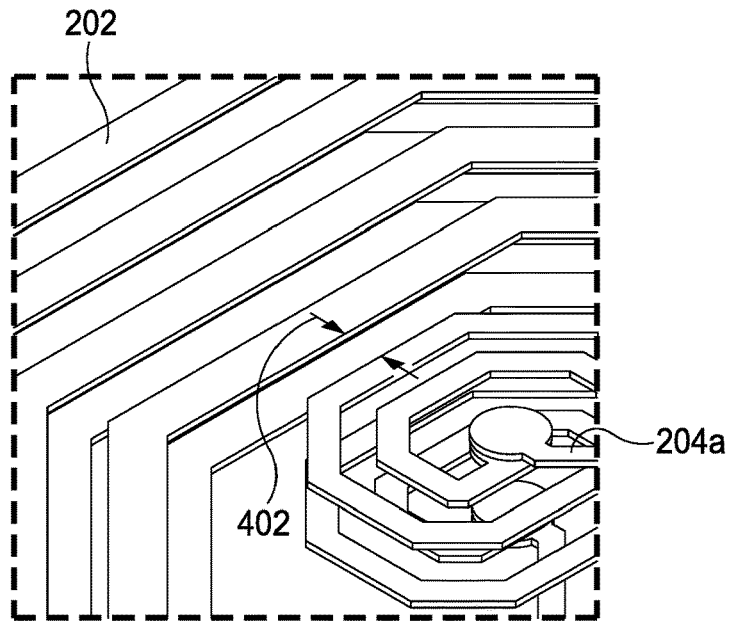
FIG. 5a is an enlarged view of a first portion of FIG. 4.

FIG. 5a is an enlarged view of a first portion of FIG. 4. FIG. 5a is not necessarily drawn to scale. As shown in FIGS. 4 and 5a, the data coil 204 is substantially centered within the power coil 202. Accordingly, the turns (e.g., traces) of the data coil 204a that are surrounded by one or more respective turns of the power coil 202 contribute to a capacitance (e.g., parasitic capacitance), which is distributed between the data coil 204a and the power coil 202, such as a capacitance within a region 402 of FIG. 5a. Such capacitance adversely affects electrical characteristics of the inductive structures 106a and/or 106b. In one example, such capacitance is distributed throughout any dielectric that separates the data coil 204a from the power coil 202. Similar capacitance exists between: (a) the power coil 202 and the data coil 204b; (b) the power coil 202 and the power coil 302; (c) the power coil 302 and the data coil 204a; (d) the power coil 302 and the data coil 204b; (e) the power coil 302 and the data coil 304a; (f) the power coil 302 and the data coil 304b; (g) the power coil 202 and the data coil 304a; (h) the power coil 202 and the data coil 304b; (i) the data coil 204a and the data coil 304a; and (j) the data coil 204b and the data coil 304b.

Figure 5B:
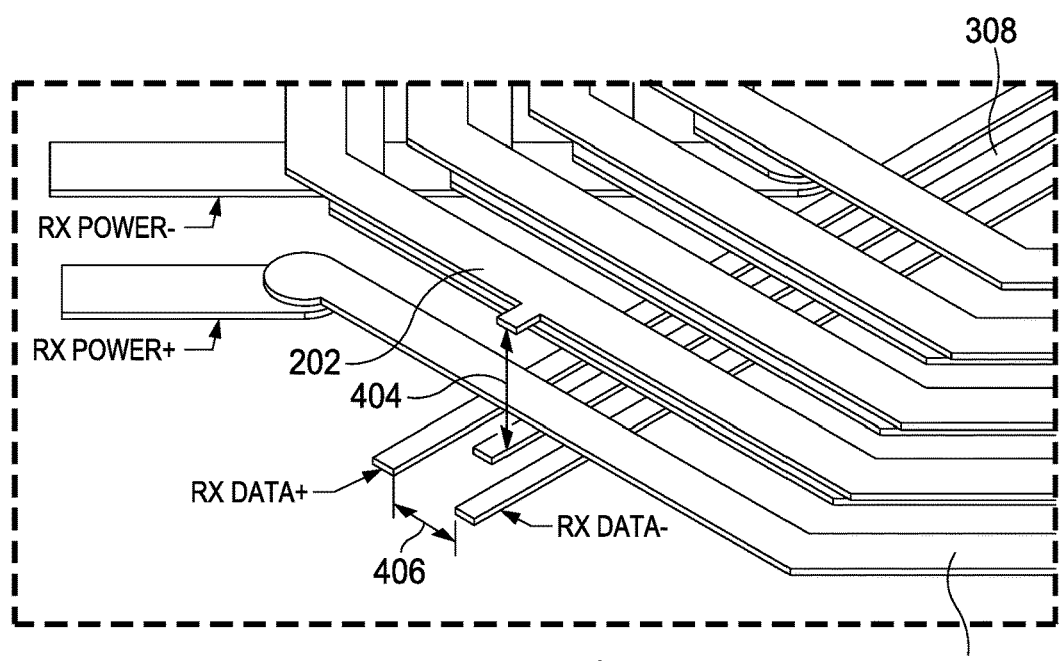
FIG. 5b is an enlarged view of a second portion of FIG. 4.

FIG. 5b is an enlarged view of a second portion of FIG. 4. FIG. 5b is not necessarily drawn to scale. As shown in FIGS. 4 and 5b, the power coil 202 is arranged in a plane that is above a plane in which the differential RX Data lines and the center tap ground line 308 are arranged. A capacitance is distributed between the center tap ground line 308 and the various turns of the power coil 202, such as a capacitance within a region 404 of FIG. 5b. In one example, such capacitance is distributed throughout any dielectric that separates the center tap ground line 308 from the power coil 202.

Also, proximity of the RX Data+ and RX Data− lines to one another contributes to a distributed capacitance that adversely affects electrical characteristics of the inductive structures 106a and/or 106b, such as a distributed capacitance within a region 406 between the RX Data+ and RX Data− lines. In one example, such capacitance is distributed throughout any dielectric that separates the RX Data+ and RX Data− lines. Similar capacitance exists between: (a) the RX Data+ and TX Data+ lines; (b) the RX Data+ and TX Data− lines; (c) the RX Data− and TX Data+ lines; (d) the RX Data− and TX Data− lines; and (e) the TX Data+ and TX Data− lines.

The distributed capacitance adversely affects electrical characteristics of the inductive structure 106, such as by capacitively coupling common mode transient events ("common mode transients") from a first data coil (e.g., data coil 204) to a second data coil (e.g., data coil 304), where the second data coil is galvanically isolated from the first data coil. In embodiments having a power coil 302, common mode transients are capacitively coupled from the surrounding power coil (e.g., power coil 302) and its overlying power coil (e.g., power coil 202) to the second data coil (e.g., data coil 304).

The electromotive coupling in inductive structure 106 (e.g., that results from mutual inductance, magnetic coupling, and distributed capacitances across a dielectric of the isolation barrier 108) is reduced by the arrangement of substantially symmetrical data coils, where each data coil has first and second portions that generate mutually counterbalancing currents in operation. In one example, the mutually counterbalancing currents are generated by turns of the first portion formed in a clockwise direction and by turns of the second portion formed in a counterclockwise direction.

The effect of the distributed (e.g., parasitic) capacitance upon the data coil 304 (such as induced by effects of a common mode transient applied to data coil 204 and/or power coil 202) is substantially reduced (and perhaps even completely eliminated) by the data coil 304 center tap being coupled to the center tap ground line 308. When a common mode transient occurs, it induces a common mode current in a first direction of the first portion (e.g., 204a) of the data coil 204 and a common mode current in a second direction of the second portion (e.g., 204b) of the data coil 204. The distributed capacitance of the isolation barrier 108 is capacitively coupled to the data coil 304, so that the common mode current in the first direction induces a common mode current in the first direction of the first portion (e.g., 304a) of the data coil 304 and the common mode current in the second direction induces a common mode current in the second direction of the second portion (e.g., 304b) of the data coil 304. The common mode current in the first direction of the first portion of the data coil 304 is substantially equal in magnitude to (yet opposite in polarity from) the common mode current in the second direction of the second portion of the data coil 304, so that both of those currents are substantially counterbalanced (e.g., cancelled) at the data coil 304 center tap.

Similarly, the effect of any common mode transient in symmetrical structures, such as optional power coil 202 and optional power coil 302 that are capacitively coupled to the data coil 304, is substantially reduced. The effect of such common mode transient is reduced by symmetrical capacitive coupling to the first and second portions of the data coil 304 (which induces associated common mode currents of opposite polarity therein) and by counterbalancing of the induced associated common mode currents at the data coil 304 center tap.

The extent of symmetry of the components of inductive structures 106a and 106b affects an extent to which the first and second portions generate (e.g., induce) mutually counterbalancing currents. For example, manufacturing tolerances may permit a relatively small amount of asymmetrical variation to form in components of inductive structures 106a and 106b, due to inconsistencies in manufacturing processes. The resulting asymmetry may result in electrical parameter mismatches, such as mismatch between: (a) respective capacitances and/or resistances of inductive structures 106a and 106b; (b) respective capacitances and/or resistances of the first and second portions of each data coil (e.g., 204 and 304); (c) respective capacitances of data coil 204 (e.g., as measured between TX Data+ and TX Data− terminal ends) and data coil 304 (e.g., as measured between RX Data+ and RX Data− terminal ends); (d) respective capacitances of power coil 202 and data coil 304; and (e) respective capacitances of power coil 302 and data coil 204. Accordingly, the resulting asymmetry contributes to CMT coupling (e.g., as discussed below with respect to FIG. 7 and FIG. 8).

Figure 6:
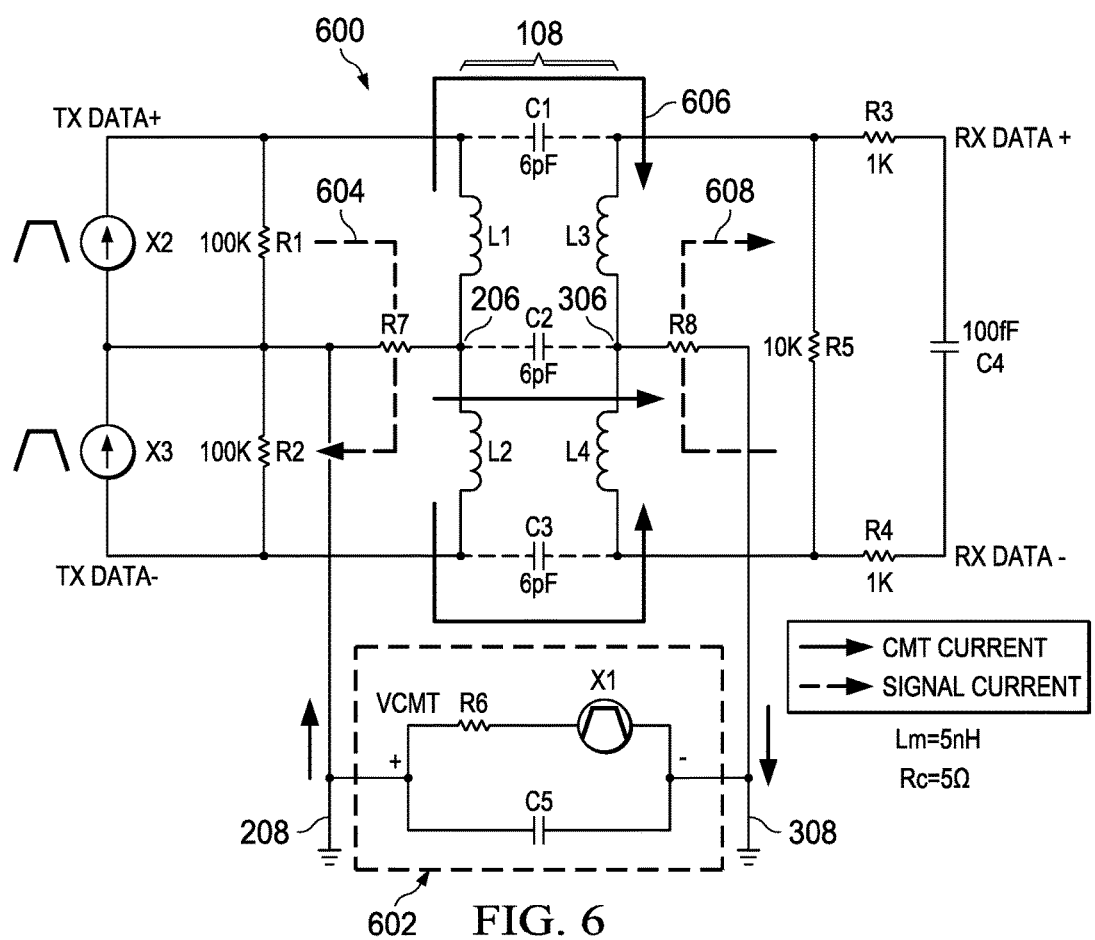
FIG. 6 is a schematic diagram of a simulation model of the inductive structure of FIG. 1.

FIG. 6 is a schematic diagram of a simulation model 600 of the inductive structure 106. As shown in FIG. 6, the model 600 includes: (a) signal generators X1, X2 and X3; (b) resistors R1, R2, R3, R4, R5, R6, R7 and R8; (c) coils L1, L2, L3 and L4; and (d) capacitors C1, C2, C3, C4 and C5.

In operation, signal generators X2 and X3 provide stimulus for simulating the reception of TX Data+ and TX Data−, respectively. For example, the signal sources provide currents that generate a voltage across a network including resistors R1, R2 and R7 and coils L1 and L2 (which simulate an operation of data coil 204a and data coil 204b, respectively). Because of the relatively high impedances of resistors R1 and R2 (e.g., 100 kilohms each), a current 604 primarily flows: (a) in a first direction from TX Data+ through coils L1 and L2 to TX Data− when TX Data+ is high and (b) in a second direction from TX Data− through coils L2 and L1 to TX Data+ when TX Data+ is low.

The mutual inductance of coil L1 with coil L3, and the mutual inductance of coil L2 with coil L4, induce a current 608 to primarily flow: (a) in a first direction from RX Data− through coils L4 and L3 to RX Data+ when TX Data+ is high; and (b) in a second direction from RX Data+ through coils L3 and L4 to RX Data− when TX Data+ is low. Resistors R3 and R4 (e.g., 1 kilohm), resistor R5 (e.g., 10 kilohms), and capacitor C4 (100 femto-Farads) simulate the input impedance that helps develop the RX Data+ and RX Data− voltages.

Stimulus block 602 applies a common mode transient via the center tap of each coil of the primary coils (e.g., coils L1 and L2) and secondary coils (e.g., coils L3 and L4), so that a common mode transient is capacitively coupled across the isolation barrier 108. For example, a positive output of stimulus block 602 is coupled to a first terminal of resistor R7. In this example, resistor R7 is 5 ohms, which simulates resistance in the ground path of the center tap of the primary coils (e.g., coils L1 and L2) through node 206 (which is coupled to a second terminal of resistor R7). Also, a negative output of stimulus block 602 is coupled to a first terminal of resistor R8. In this example, resistor R8 is 5 ohms, which simulates resistance in the ground path of the center tap of the secondary coils (e.g., coils L3 and L4) through node 306 (which is coupled to a second terminal of resistor R8).

Accordingly, the respective center taps (e.g., nodes 206 and 306) of the primary and secondary coils are also the grounds or optimized impedances (e.g., impedance devices Z1 and Z2, respectively, to the grounds) of the circuitry on respective sides of the isolation barrier 108. The respective center taps of the primary and secondary coils provide low impedance paths (e.g., to ground) for common-mode transient-induced current, which helps to: (a) reduce the effect of common mode transients upon the differential RX Data lines; and (b) accordingly, ensure robust data transfer, and allow simpler transmitter 102 and receiver 104 designs.

Stimulus block 602 generates a common mode transient using signal generator X1. Signal generator X1 generates a pulse having a relatively high rate of change in a rising edge and falling edge of the pulse. The pulse simulates a relatively large (e.g., for robust testing) common mode transient voltage (e.g., measured in kilovolts per microsecond), which is applied across the primary and secondary coils as described below. Resistor R6 and capacitor C5 low-pass filter the output of the stimulus block 602 to compensate for discontinuities in slope caused by piecewise functionality of the signal generator X1. For example, the discontinuities in slope occur at the junction (e.g., "sharp corner") of the rising edge and the peak level, and likewise occur at the junction of the peak level and falling edge of the common mode transient pulse.

When the stimulus block 602 applies (e.g., injects) a common mode transient between the two isolated grounds, the distributed capacitance (e.g., modeled by capacitors C1, C2 and C3) of the isolation barrier 108 capacitively transfers a current 606 across the isolation barrier 108. The transferred current 606 is proportional to the distributed capacitance of the isolation barrier 108 and is proportional to the rate of change of the applied transient voltage.

If coupling between the coils L1, L3 pair and L2, L4 pair is hypothetically 100% efficient, then coil inductances of L3 and L4 would not substantially affect the transferred current 606 (e.g., coupled via capacitors C1 and C3), because the flux of L1 would substantially cancel the flux of L3, and the flux of L2 would substantially cancel the flux of L4, and the very small coil resistances would have a very small effect on the transferred current 606. By comparison, if such coupling is less than 100% efficient (e.g., as in a real physical structure), then the transferred current 606 would encounter impedance from the leakage inductances and coil resistances of L3 and L4.

The effect of applied common mode transient upon the differential RX Data lines is substantially zero when the transient-induced current conducted coil L3 is substantially the same magnitude and opposite in polarity to the transient-induced current conducted by L4. In the event of any mismatch in symmetry between inductive structures 106a and 106b, the transient-induced current conducted by L3 would not completely cancel the transient-induced current conducted by L4, and the non-cancelled portion of transient induced current would have a small effect on the differential RX Data lines, as discussed below with reference to FIG. 7 and FIG. 8.

Figure 7:
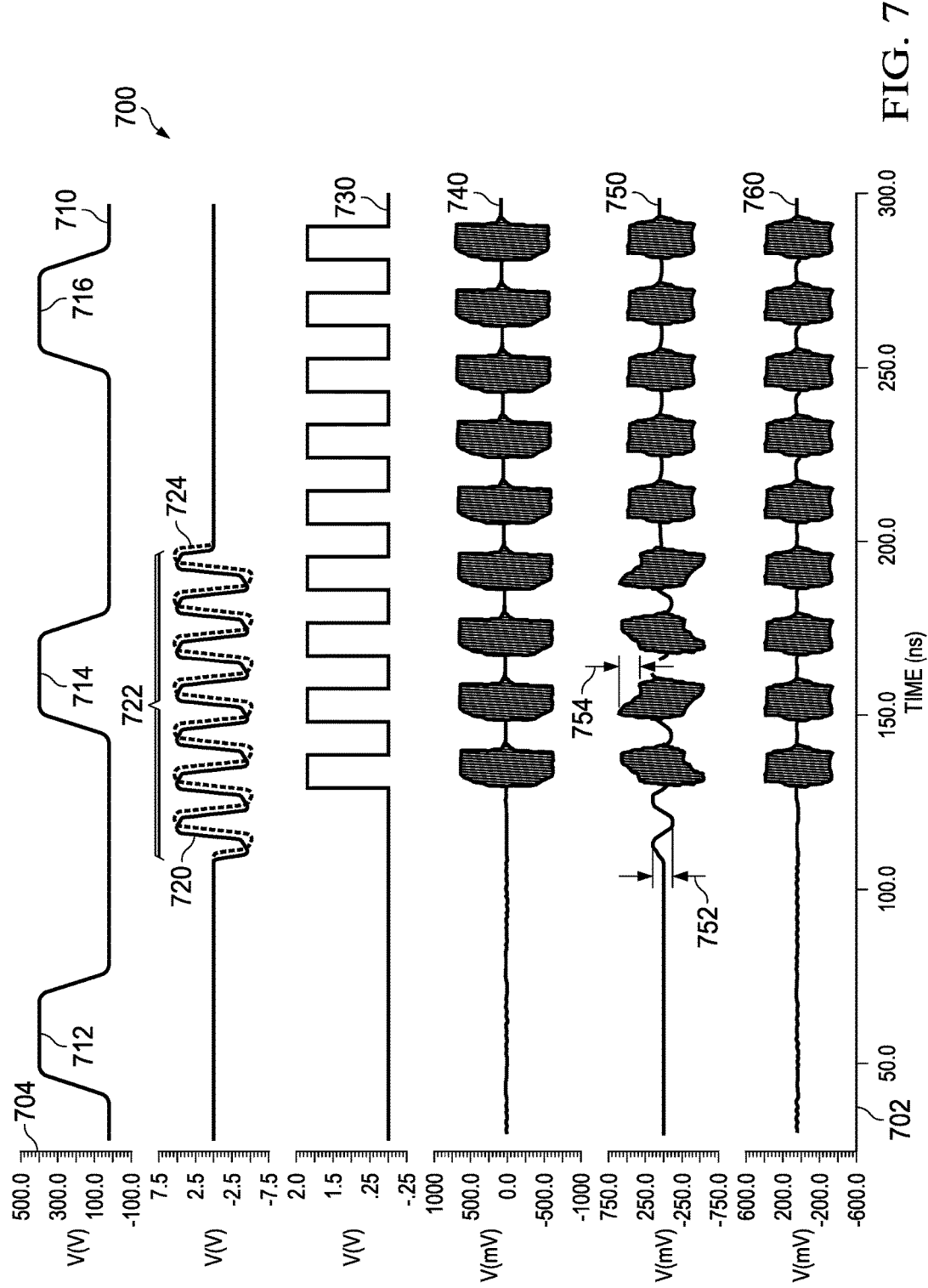
FIG. 7 is an example waveform diagram of the inductive structure of FIG. 1.

FIG. 7 is an example waveform diagram 700 of the inductive structure 106. The diagram 700 includes: (a) a horizontal axis 702 having units of nanoseconds; and (b) a vertical axis 704 having units of voltage (e.g., volts or millivolts).

Trace 710 is a waveform representing common mode transient pulses 712, 714 and 716. Common mode transient pulse 712 has a peak voltage of 400 volts, a rising edge that is initiated near the 40 nanosecond mark, and a falling edge that is initiated near the 60 nanosecond mark. Common mode transient pulse 714 has a peak voltage of 400 volts, a rising edge that is initiated near the 140 nanosecond mark, and a falling edge that is initiated near the 170 nanosecond mark. Common mode transient pulse 716 has a peak voltage of 400 volts, a rising edge that begins near the 250 nanosecond mark, and a falling edge that begins near the 280 nanosecond mark.

Trace 720 is a waveform representing alternating current of approximately 5 volts to approximately −5 volts flowing through the power coil 202. The alternating current flows through the power coil 202 for a period 722 that begins near the 100 nanosecond mark for a duration of ~100 nanoseconds. Trace 724 is a waveform representing alternating current flowing through the power coil 302. The waveform of trace 724 is inductively coupled from the alternating current flowing through the power coil 202 and accordingly is phase-delayed relative to trace 720.

Trace 730 is a waveform representing data to be transmitted (before modulation) at a data rate of ~50 MHz. Trace 730 includes a series of data encoded using waveforms that alternate between ~2 volts and ground. The series of data includes 10 nanosecond-long pulses and begins near the 130 nanosecond mark.

Trace 740 is a waveform representing data being transmitted (after modulation) across the TX Data+ line. Trace 740 represents a series of modulated bits, which are modulated by a 2 GHz carrier signal that alternates between approximately 800 millivolts and −800 millivolts. For example, the presence of a carrier signal indicates a logic 1 state of data being transmitted.

Trace 750 is a waveform representing data being received (after modulation) across the RX Data+ line. Trace 750 represents a series of modulated bits, where the presence of a carrier signal that alternates between approximately 500 millivolts and −500 millivolts indicates a logic 1 state of data being received. Trace 750 also indicates the cross-coupling of the power coil related signals of traces 720 and 724 to the RX Data+ line. For example, the coupling causes power coil interference 752 on the RX Data+ line when no data is being received via the RX Data+ line. Also, the coupling causes power coil interference 754 on the RX Data+ line when data is being received via the RX Data+ line. In contrast, the common mode transient signal coupling to the TX Data+ line is negligible and is virtually imperceptible at the scale of trace 750.

Trace 760 is a waveform representing the RX Data+ line after high-pass filtering by generator block 114. As illustrated by trace 760, the high-pass filtering removes the power coil interferences 752 and 754 to generate a well-formed modulated data signal, whose data is robustly and readily detectable by demodulator 116.

Figure 8:
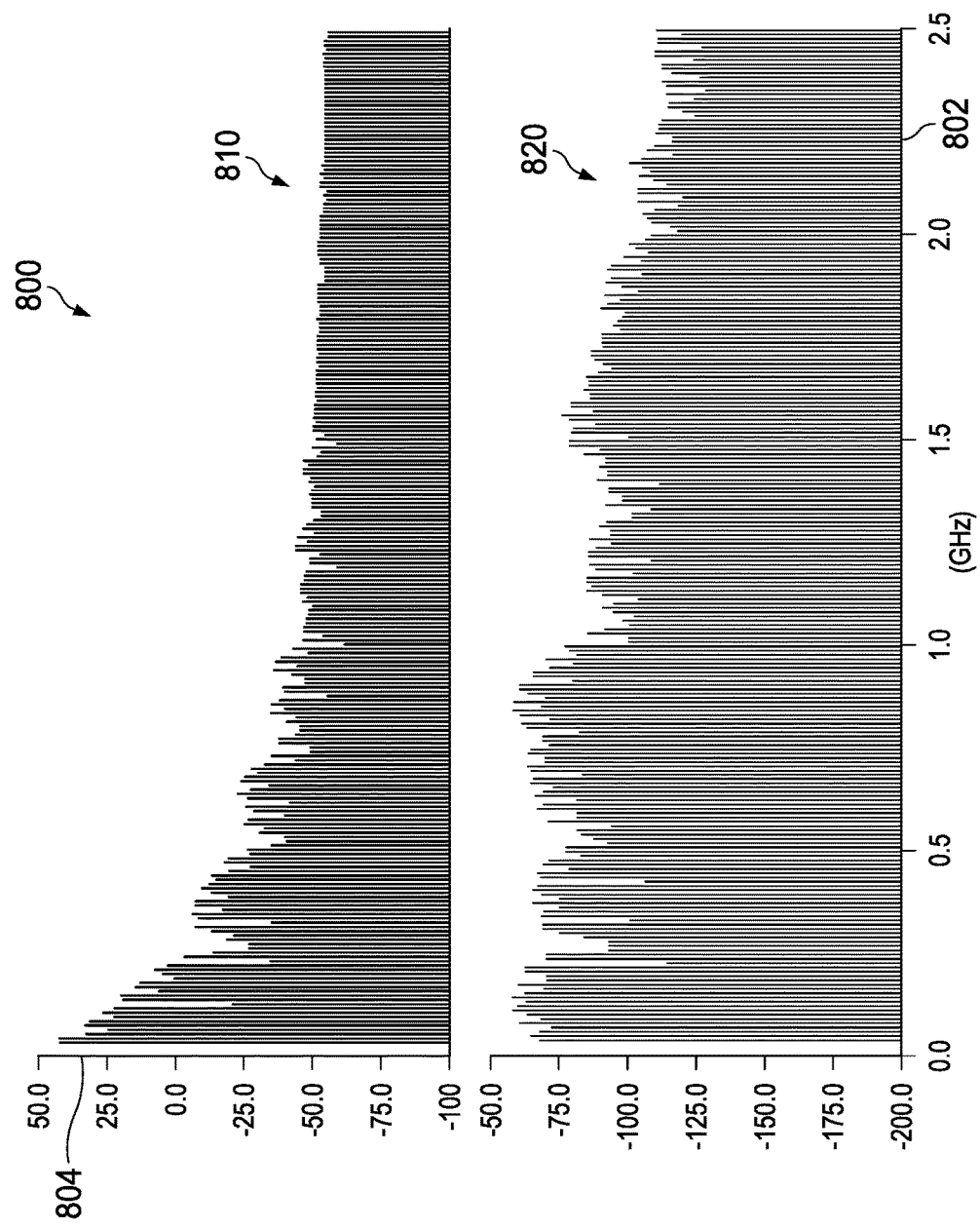
FIG. 8 is a histogram of spectral densities illustrating common mode transient immunity of the inductive structure of FIG. 1.

FIG. 8 is a histogram 800 of spectral densities illustrating common mode transient immunity of the inductive structure 106. Histogram 800 includes: (a) a horizontal axis 802 having units of gigahertz (GHz); and (b) a vertical axis 804 having units of power represented as decibels (dB). Spectral display 810 illustrates the power density of a common mode transient (such as common mode transient pulse 712) as applied to node 206, where the power (as a function of frequency) drops from approximately 50 dB near direct current to approximately −25 dB near 500 MHz. Spectral display 820 illustrates the power density of a common mode transient (such as common mode transient pulse 712) as measured at node 306, where the power averages approximately −75 dB in a frequency range of approximately 0-500 MHz. Accordingly, the center tap architecture of data coils 204 and 304 provides common mode transient immunity of greater than ~50 dB.

Figure 9:
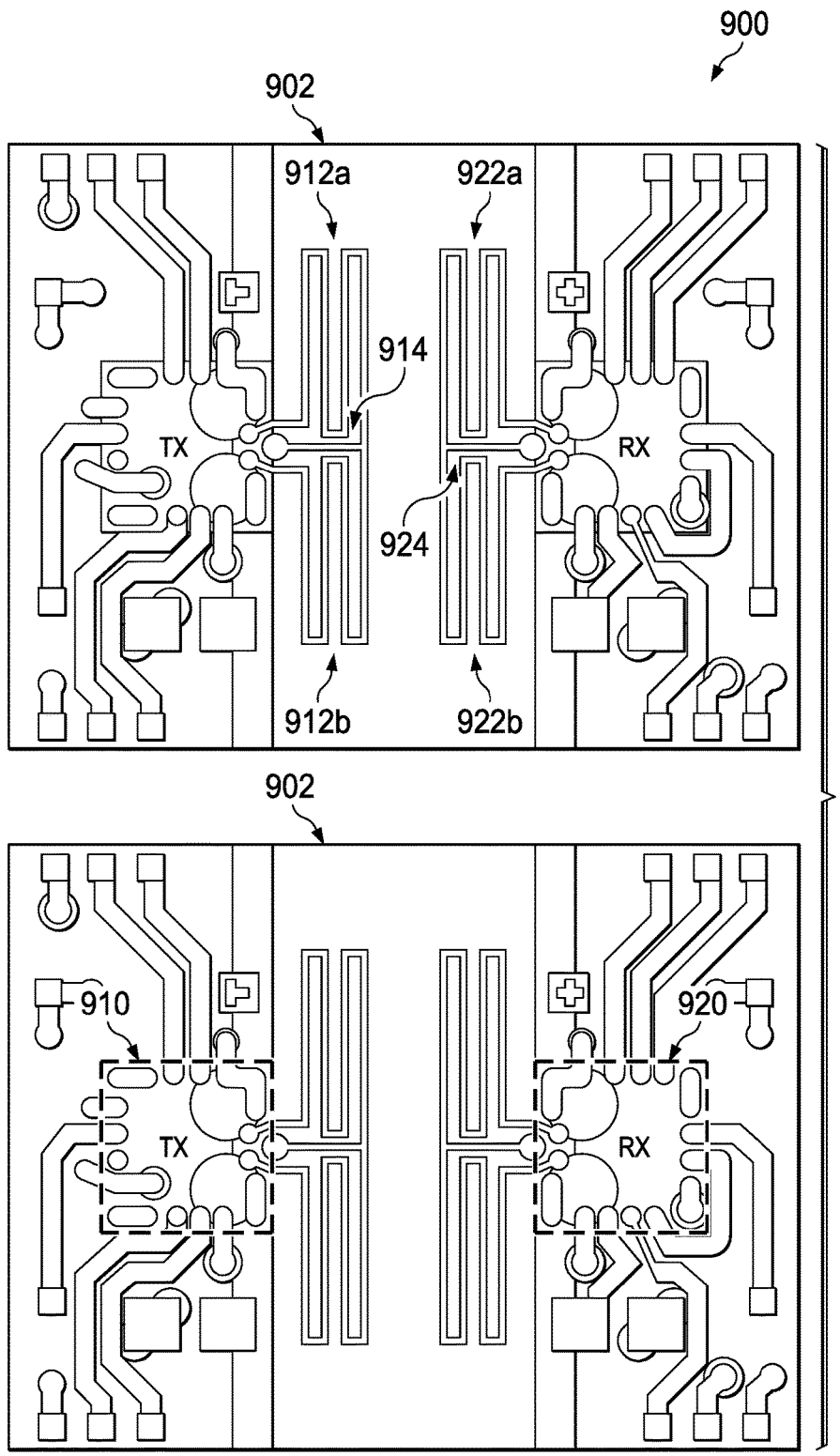
FIG. 9 is a layout view of an alternative version of the inductive structure of FIG. 1.

FIG. 9 is a layout view of an alternative version of the inductive structure 106. As shown in FIG. 9, the alternative version has a structure 900, which is formed on a substrate 902 (e.g., printed circuit board) and includes: (a) a transmitter (TX) 910 (which is similar to transmitter 102); and (b) a receiver (RX) 920 (which is similar to receiver 104). The structure 900 further includes: (a) inductive structures 912a and 912b (collectively, "inductive structure 912"); and (b) inductive structures 922a and 922b (collectively, "inductive structure 922"). The inductive structures 912 and 922 are each similar to the inductive structure 106, but they do not have the "coiled" shape of data coils 204 and 304 (and do not include power coils 202 and 302). The inductive structures 912 and 922 are substantially identical to one another and/or are mirror images of one another around an axis of symmetry. In accordance with the description of FIG. 1, data is inductively transmitted from inductive structure 912 to inductive structure 922 across an isolation boundary.

Inductive structure 912a is connected to the inductive structure 912b at a node to which the center tap ground line 914 is coupled. The center tap ground line 914 is connected to a first ground or to a first optimized impedance device (e.g., impedance device Z1). Similarly, inductive structure 922a is connected to the inductive structure 922b at a node to which the center tap ground line 924 is coupled. The center tap ground line 924 is connected to a second ground or to a second optimized impedance device (e.g., impedance device Z2) that is isolated from the first ground and/or from the first optimized impedance device.

Modifications are possible in the described embodiments, and other embodiments are possible, within the scope of the claims.

What is claimed is:

1. An inductive structure, comprising:
    first and second inductive coils forming an inductive data coil, the first and second inductive coils being arranged to conduct respective first and second common mode currents induced by a common mode transient between: a first ground coupled to a connection between the first and second inductive coils; and a galvanically isolated second ground; and
    an inductive power coil around the inductive data coil.

2. The inductive structure of claim 1, wherein the connection between the first and second inductive coils is a center tap.

3. The inductive structure of claim 1, wherein the first inductive coil is arranged to conduct the first common mode current in a first direction, and the second inductive coil is arranged to conduct the second common mode current in a second direction.

4. The inductive structure of claim 3, wherein the second direction is opposite the first direction.

5. The inductive structure of claim 1, wherein the first and second inductive coils are reversed from one another.

6. The inductive structure of claim 1, wherein the first and second inductive coils are identical to one another.

7. The inductive structure of claim 1, wherein the first and second inductive coils are arranged to symmetrically conduct the respective first and second common mode currents.

8. The inductive structure of claim 1, wherein the first and second common mode currents are capacitively induced by the common mode transient.

9. The inductive structure of claim 1, wherein the first and second common mode currents are opposite in polarity.

10. The inductive structure of claim 1, wherein the first and second common mode currents have a same magnitude.

11. The inductive structure of claim 1, wherein the inductive data coil is arranged to output data by inductive coupling.

12. The inductive structure of claim 1, wherein the inductive data coil is arranged to receive data by inductive coupling.

13. An inductive structure, comprising:
    first and second inductive coils forming an inductive data coil, the first and second inductive coils being arranged to conduct respective first and second common mode currents in opposite directions, the first and second common mode currents being capacitively induced by a common mode transient between: a first ground coupled to a connection between the first and second inductive coils; and a galvanically isolated second ground; and
    an inductive power coil around the inductive data coil.

14. The inductive structure of claim 13, wherein the connection between the first and second inductive coils is a center tap.

15. The inductive structure of claim 13, wherein the first and second inductive coils are reversed from one another.

16. The inductive structure of claim 13, wherein the first and second inductive coils are arranged to symmetrically conduct the respective first and second common mode currents.

17. The inductive structure of claim 13, wherein the first and second common mode currents are opposite in polarity.

18. The inductive structure of claim 17, wherein the first and second common mode currents have a same magnitude.

19. The inductive structure of claim 13, wherein the inductive data coil is arranged to output data by inductive coupling.

20. The inductive structure of claim 13, wherein the inductive data coil is arranged to receive data by inductive coupling.

* * * * *